United States Patent
Humphris

(10) Patent No.: US 8,220,066 B2
(45) Date of Patent: Jul. 10, 2012

(54) VIBRATION COMPENSATION IN PROBE MICROSCOPY

(75) Inventor: Andrew Humphris, Oxfordshire (GB)

(73) Assignee: Infinitesima Ltd., Oxfordshire (GB)

( * ) Notice: Subject to any disclaimer, the term of this patent is extended or adjusted under 35 U.S.C. 154(b) by 338 days.

(21) Appl. No.: 12/672,022

(22) PCT Filed: Aug. 4, 2008

(86) PCT No.: PCT/GB2008/050660
§ 371 (c)(1),
(2), (4) Date: Mar. 31, 2010

(87) PCT Pub. No.: WO2009/019513
PCT Pub. Date: Feb. 12, 2009

(65) Prior Publication Data
US 2010/0235955 A1    Sep. 16, 2010

(30) Foreign Application Priority Data
Aug. 3, 2007    (GB) ................................ 0715102.0

(51) Int. Cl.
*G01Q 20/02*    (2010.01)
(52) U.S. Cl. ......... 850/6; 850/1; 850/4; 850/18; 850/19; 850/26; 850/33; 850/55; 356/487; 356/493
(58) Field of Classification Search .................. 850/1, 6, 850/4, 18, 19, 26, 33, 55; 356/487, 493; 250/235
See application file for complete search history.

(56) References Cited

U.S. PATENT DOCUMENTS

| 6,178,813 B1 * | 1/2001 | Bruno et al. ................... 73/105 |
| 7,249,002 B1 * | 7/2007 | Ben-Dov et al. ............. 702/195 |
| 2006/0215171 A1 * | 9/2006 | Nakata et al. ................. 356/487 |

FOREIGN PATENT DOCUMENTS

| DE | 4344499 | 7/1995 |
| EP | 0422548 | 4/1991 |
| JP | 59168304 | 9/1984 |
| JP | 05079834 | 3/1993 |
| JP | 05187866 | 7/1993 |
| JP | 06082250 | 3/1994 |

OTHER PUBLICATIONS

"Surface Profilometer with Ultra-High Resolution," IBM Technical Disclosure Bulletin, vol. 35, No. 3, Aug. 1, 1992, pp. 207-208, XP000326239.

* cited by examiner

*Primary Examiner* — Jack Berman
*Assistant Examiner* — Meenakshi Sahu
(74) *Attorney, Agent, or Firm* — Volpe and Koenig, P.C.

(57) ABSTRACT

A The local probe microscopy apparatus (1) comprises a probe (3) with translation stages (5a, 5b) for controlling the position of the probe (3) relative to a sample surface. The probe (3) has a feedback mechanism (6, 5 7) for maintaining the deflection of the probe and a height measuring system (9) which includes means for compensating for environmental noise. The local probe microscopy apparatus is particularly suitable for use as a wafer inspection tool in a wafer fabrication plant where the inspection tool is liable to be exposed to significant mechanical vibration.

34 Claims, 5 Drawing Sheets

VIBRATION COMPENSATION IN PROBE MICROSCOPY

FIELD OF THE INVENTION

The present invention generally relates to vibration compensation in probe microscopy and to a method of and apparatus for vibration compensation. The present invention is particularly, but not exclusively, suited for use in the inspection and/or review of semiconductor wafers and to a surface review tool for use in surveying and/or imaging specimen surfaces using a local probe. A particular type of local probe microscope and a field of application for which the invention is suitable is scanning force microscopy (SFM), also know as atomic force microscopy (AFM). However, it is to be understood that the invention is not restricted to such a field.

BACKGROUND AND RELATED ART

Local probe microscopy is capable of high-resolution non-destructive measurement of one or more characteristics of a specimen's surface. A typical AFM operated in contact mode includes a probe comprising a cantilever with a probe tip mounted near the free end of the cantilever. The AFM probe is mounted on a stage having actuators which provide x, y and z motion of the probe tip relative to a sample stage. An optical lever system (laser reflection from the back of the cantilever onto a segmented photodiode) or an alternative position sensitive detector is used to monitor deflection of the free end of the cantilever which arises from changes in the interaction between the probe tip and the surface of a sample on the sample stage. In constant force scanning, as the probe is moved in the x, y plane so as to scan across the surface of the sample, the height of the probe above the sample, i.e. in the z direction, is adjusted to maintain a fixed deflection of the cantilever. These z direction adjustments maintain a constant interaction force between the probe tip and the sample surface for a particular x, y location and are representative, for example, of the topography of the sample surface. With a conventional AFM of the type described above lateral and vertical resolutions of better than 2 nm and 0.1 nm respectively are achievable. Under the correct conditions, lateral resolution down to the atomic level can be achieved. However, the operation and performance of the microscope is dependent upon a knowledge of the spatial relationship between the sample and the probe. Inevitably this spatial relationship is affected, and thus the resolution is limited, by amongst other things the operating environment and in particular mechanical and acoustic noise which generate an uncertainty in the position of the probe relative to the specimen.

Various improvements have been proposed in recent years to address the problem of noise with respect to local probe microscopy. In U.S. Pat. No. 6,196,061 and U.S. Pat. No. 6,279,389, for example, an atomic force microscope (AFM) is described which employs two separate probes: one a measurement probe, the other a reference probe mounted on opposite corners of a single cantilever. The reference probe is flattened (made dull) so as to average the specimen topography as the flattened probe is scanned over the specimen. Additionally, the microscope includes a structure which mechanically links the specimen platform to the structure supporting the local probe. Deflection of the cantilever is measured optically from a point on the back of the cantilever midway between the two probes and thus generates a signal with a reduced noise component that provides differential deflection measurements with respect to the surface area adjacent the measurement probe and thus is not independent of the scanning measurements. However, the AFM is restricted to differential deflection data; no absolute deflection measurements of the measurement probe can be produced using this microscope. These two patents also describe an alternative probe consisting of multiple cantilevers arranged parallel to one another with interdigitated fingers along each side edge. The interdigitated fingers act as diffraction gratings again providing differential deflection data.

In US 2003/0020500 and US 2005/0040836 a probe having two or more probe tips each individually mounted on a respective cantilever but with common position control is described. The individual probe tips are arranged so that one tip, a distance sensor, is positioned lower, i.e. closer to the sample stage, than the remaining probe tips. Unlike U.S. Pat. No. 6,196,061 and U.S. Pat. No. 6,279,389, with this version of a probe having multiple cantilevers, the deflection of each cantilever is separately monitored using, for example, a conventional optical lever technique. The distance sensor provides a reference height measurement from the sample surface and is used to maintain the distance of the remaining probe tips in the z direction from the surface of the sample. This permits the surface of the sample to be scanned using the probe tips at well defined distances above the surface of the sample. However, as a result of the common position control, the height reference measurement of the distance sensor is not independent of the scanning measurements.

Semiconductor device fabrication involves highly complex techniques for constructing integrated circuits using semiconductor materials. Due to the large scale of circuit integration and the decreasing size of semiconductor devices, the semiconductor fabrication process is prone to processing defects. Current testing procedures, involving separate inspection and review processes, are therefore critical to maintain quality control. Since the testing procedures are an integral and significant part of the fabrication process, the semiconductor industry is constantly seeking for more accurate and efficient monitoring procedures.

The inspection process involves an initial scan of the surface of the semiconductor wafer by a high-speed, relatively low-resolution inspection tool. A defect map is then produced showing suspected locations on the wafer having a high probability of a defect. When a review of affected wafers is warranted, either the optics of the inspection apparatus must be changed to a higher (review) resolution or the wafers are transferred to a different tool altogether. To perform the review, the defect map is fed to the review apparatus and then individual suspected defect sites are more closely scrutinised by means of a relatively high-resolution image. That image is analysed, for example involving the use of pattern recognition techniques in the case of automated defect classification (ADC), to determine the nature of the defect i.e. to classify the defect in order to discriminate between, for example, a defective pattern, damage caused by a foreign particle or a surface scratch.

Optical methods such as dark and bright field microscopy have been used in wafer defect review and classification processes. However, such optical devices are limited in their ability to analyze and accurately identify defect types on a semiconductor wafer. This is especially the case as the thrust of future development in the semiconductor device field is to ever higher densities of integrated circuits, involving submicron and sub 100 nm device features, as well as structures with increased aspect ratios. As a result, due to its greater resolution, scanning electron microscopy or "SEM" is favoured in defect review and classification of features on the wafer. However, scanning electron microscopy has the disadvantage that not only must the wafers be removed from the production line; they have to be transferred to an evacuated enclosure for the purposes of electron microscopy. This can add considerable time to the inspection and review procedure, which increased time is undesirable. Moreover, scanning electron microscopy can result in damage to the wafer surface via beam damage and/or contamination.

Local probe microscopy techniques, such as those described above, are capable of providing high resolution information on surface features of a sample. However, due to the length of time required to produce a surface scan using conventional scanning probe microscopy apparatus, the application of such microscopy techniques is limited in large-scale wafer fabrication. Moreover, as with all local probe techniques, the resolution and capabilities of such local probe microscopy apparatus are directly affected by environmental mechanical vibrations, especially where a local probe is mounted in a conventional inspection/review tool. The effect of environmental mechanical vibrations is increased when using a long mechanical path between the probe and sample as is required for large samples such as wafers used in semi-conductor device fabrication. Additionally, the need to move and reposition the sample, e.g. a wafer, introduces mechanical vibrations which must settle before a measurement can be collected and this reduces throughput.

Scanning probe microscopes which employ interferometers for vibration and noise cancellation have been described in U.S. Pat. No. 6,178,813 and U.S. Pat. No. 7,249,002. In each of these documents in addition to the usual scanning probe system an interferometer is used to monitor the separation between a point on the sample surface and a fixed point. Measured variations in this separation are used to compensate for noise in the measurements produced by the scanning probe. However, microscopes employing these noise compensation techniques require two separate measurement systems and are thus costly. More importantly the interferometers are only capable of measuring displacements, representative of noise amplitudes, of less than half a wavelength.

SUMMARY OF INVENTION

The present invention is specifically concerned with providing vibration compensation for use with local probe microscopy apparatus which is suitable, but not exclusively so, for use in a semiconductor device fabrication plant.

The present invention therefore provides a method of compensating for vibration in a local probe measurement apparatus which would otherwise create uncertainty in the position between the probe and a sample, wherein the method comprises the steps of scanning a scanning probe relative to the surface of the sample; reflecting a probe beam off a reflective point having a known spatial relationship with respect to the scanning probe; simultaneously reflecting a reference beam off a fixed reference point subject to vibration substantially the same as the vibration experienced by the sample; and interferometrically combining the reflected probe beam and the reflected reference beam to generate differential probe height data which incorporates compensation for the vibration, the differential probe height data being representative of either changes in the interaction between the scanning probe and the sample surface or the topography of the sample surface.

Preferably the reference beam is reflected from a predetermined fixed point on one of: the sample, the sample stage and the sample stage Support. Alternatively the measurement apparatus may include a reference probe and the reference beam is reflected from a predetermined fixed point having a known spatial relationship relative to the reference probe.

In one embodiment the method further comprises monitoring the interaction between the scanning probe and the sample surface and adjusting the position of the scanning probe to maintain a substantially constant interaction. Ideally the deflection of the scanning probe is monitored and the position of the scanning probe is adjusted to maintain a substantially constant deflection.

In a further preferred embodiment the method further comprises monitoring the separation of a first fixed predetermined position from a second predetermined position on one of the sample, sample stage and sample stage support wherein the separation is substantially parallel to one or other of the scan axes.

A fixed sensor may be provided to monitor the separation and the fixed sensor may be an optical displacement detector. Alternatively, the fixed sensor may comprise an interferometric device employing a reference beam reflected off a reference point having a predictable spatial relationship with respect to the probe of the microscopy apparatus, the detected changes in the separation comprising differential lateral separation data. Also, separations between at least two pairs of predetermined fixed positions may be monitored, the separation between the first pair of fixed positions being substantially orthogonal to the separation between the second pair of fixed positions.

In a further alternative embodiment a separate scanning reference probe is used to scan a predefined reference structure which is subject to vibration substantially the same as the vibration experienced by the sample, the shape of the reference structure being defined to enable detection by the scanning reference probe of changes in the position of the reference structure parallel to the scanning plane.

With these embodiments the trajectory of the scanning probe may be adjusted in response to detected changes in the one or more monitored separations or the position of the reference structure. Alternatively, the differential probe height data may be recorded as data points in a pixellated array and the data points within the pixellated array are adjusted, for example in terms of their placement, in dependence upon detected changes in the one or more monitored separations or the position of the reference structure.

In a separate aspect the present invention provides a method of correcting for vibration in a local probe measurement apparatus, wherein the method comprises detecting changes in the separation of a first fixed predetermined position from a second predetermined position on one of the sample, sample stage and sample stage support representative of vibration wherein the separation is substantially parallel to one or other of the scan axes.

Ideally the method further comprises, simultaneously with the step of detecting changes in the separation, scanning a scanning probe relative to the surface of the sample in an imaging plane of the sample and monitoring changes in height of the scanning probe either representative of changes in the interaction between the scanning probe and the sample surface or representative of the topography of the sample surface.

A fixed sensor may be provided to monitor the separation which may be an optical displacement detector or may be an interferometric device employing a reference beam reflected off a reference point having a fixed spatial relationship with respect to the probe of the microscopy apparatus, the detected changes in the separation comprising differential lateral separation data.

Optionally, separations between at least two pairs of predetermined fixed positions are monitored, the separation between the first pair of fixed positions being substantially orthogonal to the separation between the second pair of fixed positions.

In either case the trajectory of the scanning probe may be adjusted in response to detected changes in the one or more monitored separations or changes in the height of the scanning probe may be recorded as data points in a pixellated array and the placement of the data points within the pixellated array is adjusted in dependence upon detected changes in the one or more monitored separations.

In a third aspect the present invention provides local probe microscopy apparatus comprising a scanning probe; scanning means for scanning the probe relative to the surface of a sample which is subject to externally applied vibration; an imaging device for reflecting a probe beam off a reflective point having a fixed spatial relationship with respect to the scanning probe and for simultaneously reflecting a reference beam off a fixed reference point subject to vibration substantially the same as the vibration experienced by the sample; and an interferometric device for interferometrically combining the reflected probe beam and the reflected reference beam to generate differential probe height data which incorporates compensation for vibration, the differential probe height data being representative of either changes in the interaction between the scanning probe and the sample surface or the topography of the sample surface.

Preferably, the local probe microscopy apparatus further comprises a probe interaction detector for monitoring the interaction between the scanning probe and the sample surface and for adjusting the position of the scanning probe to maintain a substantially constant interaction. Ideally, the probe interaction detector is a probe deflection detector for monitoring the deflection of the scanning probe and a feedback mechanism in communication with the probe deflection detector for maintaining a substantially constant deflection of the scanning probe.

Optionally, the apparatus further comprises a fixed reference probe wherein the reference beam is reflected off a predetermined reference point having a fixed spatial relationship with respect to the reference probe. In a preferred embodiment the apparatus further comprises a position monitoring device adapted to detect changes in the separation of a first fixed predetermined position from a second predetermined position on one of the sample, sample stage and sample stage support representative of vibration wherein the separation is substantially parallel to one or other of the scan axes. The position monitoring device may include a fixed sensor located to monitor changes in the separation between the first and second predetermined fixed positions. The fixed sensor may be an optical displacement sensor arranged such that at least part of a reference beam extending between the optical displacement sensor and one of the predetermined fixed positions is substantially parallel to one of the scan axes of the probe. Alternatively the fixed sensor may be an interferometric device employing a reference beam reflected off a reference point having a fixed spatial relationship with respect to the probe of the microscopy apparatus, the detected changes in the separation comprising differential lateral separation data.

In a further preferred embodiment the position monitoring device is adapted to detect changes in the separations between at least two pairs of predetermined fixed positions, the separation between the first pair of fixed positions being substantially orthogonal to the separation between the second pair of fixed positions.

In a fourth aspect the present invention provides a local probe microscopy apparatus comprising a position monitoring assembly adapted to detect changes in the separation of a first fixed predetermined position from a second predetermined position on one of the sample, sample stage and sample stage support representative of vibration wherein the separation is substantially parallel to one or other of the scan axes.

In a preferred embodiment the position monitoring assembly includes at least two fixed sensors adapted to detect changes in the respective separations between at least two pairs of predetermined fixed positions, the separation between the first pair of fixed positions being substantially orthogonal to the separation between the second pair of fixed positions.

The at least one fixed sensor may be an optical displacement sensor or may be an interferometric device employing a reference beam reflected off a reference point having a fixed spatial relationship with respect to the probe of the microscopy apparatus, the detected changes in the separation comprising differential lateral separation data.

It is to be understood that reference herein to a scanning probe and to a probe which scans a specimen or sample is intended to encompass any probe which is adapted to collect measurements or data representative of characteristics of the specimen or sample at a plurality of different positions on the surface of the specimen or sample i.e. different x and/or y and/or z positions. Hence, reference herein to a scan line is intended to encompass a linear path over the surface of a specimen or sample along which a probe tip gathers information concerning the specimen or sample. The information gathered along the scan line is used to produce an image of the characteristics of the specimen or sample, the image having a conformation and orientation corresponding to the conformation and orientation of the scan line and which, in the case of digital images, will be formed of a plurality of pixels.

The present invention is applicable to the whole range of local probe techniques, including contact mode and intermittent-contact and non-contact dynamic modes of operation for the AFM and other scanning probe microscopy (SPM) techniques which are all sensitive to vibration. Since it is not possible to give a complete list of SPM techniques to which the invention can be applied, only some important techniques are listed below as non-limiting examples: scanning tunnelling microscopy (STM), magnetic force microscopy (MFM), scanning capacitance microscopy (SCM), scanning near-field microscopy (SNOM), lateral force microscopy (LFM) and electric field/force microscopy (EFM).

BRIEF DESCRIPTION OF THE DRAWINGS

The present invention will now be described by way of example only with reference to the accompanying drawings, in which.

DETAILED DESCRIPTION OF EXEMPLARY EMBODIMENTS

Figure 1:
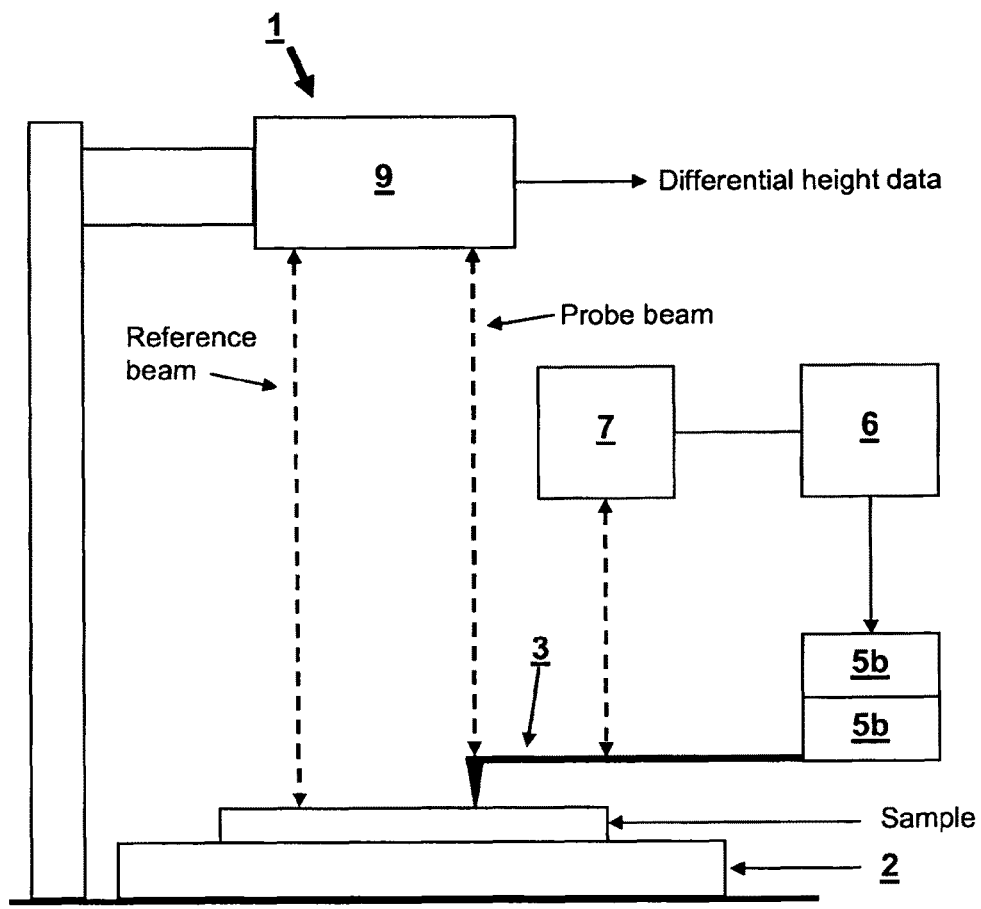
FIG. 1 is a schematic overview of one embodiment of scanning probe microscopy apparatus in accordance with the present invention.

FIG. 1 illustrates scanning probe microscopy (SPM) apparatus 1 including noise compensation apparatus. The apparatus 1 shown in FIG. 1 includes a sample stage 2, adapted to receive a sample. A probe 3 is mechanically connected to x, y, and z translation stages 5a for controlling fine movement of the probe 3 in all three orthogonal directions. The translation stages preferably comprise a set of piezoelectric transducers arranged to effect independent movement of the probe in the three orthogonal directions. One or more separate coarse positioning drives 5b are also provided for driving the initial approach of the probe 3 to the sample on the sample stage 2. The coarse positioning drives 5b optionally consist of orthogonally arranged actuators. The coarse positioning drives 5b and the translation stages 5a are, in turn, in communication with and controlled by a controller 6. The translation stages 5a and positioning drives 5b provide fine and coarse positioning of the probe 3 relative to the sample stage 2 respectively and can be implemented in many different configurations and with many different position devices. For example, although the translation stages 5a and the positioning drives 5b are shown in FIG. 1 arranged to move the probe 3, it may be preferable to move the sample stage 2 or split axes of the translation stages 5a and positioning drives 5b between moving the sample stage 2 and probe 3. Moreover, it will be appreciated that the above and a piezo tube scanner are only examples of the many different position control systems that may be implemented with SPM apparatus.

As is conventional in the field, the z axis of a Cartesian coordinate system is taken to be that perpendicular to a plane occupied by the sample. That is, the probe—sample interaction is dependent both on the x,y position of the probe 3 with respect to the sample, and also on its height (z axis) above the sample.

The microscopy apparatus 1 includes a probe deflection detection mechanism 7 which is arranged to monitor deflection of the cantilever of the probe 3 for example employing an optical lever technique in which a laser beam, reflected off the back of the cantilever, is incident on a split photodiode comprising of two segments. The point of reflection has a known or predictable spatial relationship with respect to the tip of the probe. By monitoring the difference in the intensity of light on the two segments of the photodiode the position of the reflected light beam and thus the deflection of the cantilever can be monitored. The deflection detection mechanism 7 forms part of a feedback mechanism whereby the controller 6 is supplied with the output from the deflection detection mechanism 7 and on the basis of that output the controller 6 controls the translation stages 5a to adjust the separation of the probe from the sample surface so as to maintain a predetermined deflection of the probe cantilever.

To generate an image or map of the interaction of the constant deflection probe with the surface of the sample a height detection system 9 is used to monitor the fluctuating height of the probe. The position of the height detection system 9 is fixed in relation to the support for the sample stage but the microscopy apparatus described above is susceptible to any uncertainty in the spatial relationship and thus the mechanical path between the sample stage 2 and probe 3 and the mechanical path is affected by environmental noise particularly with respect to the vertical position of the probe relative to the sample. To address this susceptibility the height detection system 9 shown in FIG. 1 includes means for compensating for environmental noise affecting the z position of the probe. The height detection system 9 employs a differential interferometric technique for monitoring the height of the probe 3 which has the advantage of providing self calibrated height data with respect to the wavelength of the light source. Additionally, if the reflected light has sufficient intensity the interferogram, and thus the displacement measurement, is not affected by spurious reflections from the surface of the sample. Thus the height detection system 9 is preferably based on a two-beam interferometric design which generates a measure of the absolute height of the probe and which inherently incorporates compensation for environmental noise.

With the two-beam interferometric design of the height detection system 9 a first beam, the probe beam, is reflected off a point which is in fixed spatial relationship to the probe tip, most commonly the back of the probe. Simultaneously a second beam, the reference beam, is reflected off a predetermined position which is subject to the same or substantially the same externally applied vibration as the sample for example on the support for the sample stage, the sample stage or the sample itself. Ideally, the probe beam and the reference beam are generated from a single common light source. Whilst the surface of a sample is scanned by the microscopy probe and the fluctuation in height of the probe is monitored by the probe beam, the reference beam is not scanned relative to the sample surface i.e. neither the x,y position of the height detection system nor the x,y reference position on the sample stage support, sample stage or sample, which is the point of reflection for the reference beam, is changed. After reflection the two beams are interferometrically combined to generate a differential height measurement output from the height detection system 9 which is directly representative of one or more characteristics of the sample surface or, as in the illustrated example where a feedback mechanism is used to maintain a constant interaction, the differential height measurement is directly representative of the topography of the sample surface or other changes in a characteristic of the sample affecting the interaction measurement.

In this example the support member for the probe has a low spring constant parallel to the z direction. This results in the frequency content of the height information output by the detection system potentially including height information with frequencies greater than the first resonant mode of the support member. Thus, by means of a low spring constant probe cantilever in combination with a differential interferometric device the range of variation of the interaction force between the probe and sample is minimised and also damage to the surface of the sample can be minimised. In this way high resolution topographical data of the sample surface can be collected. Thus the spring constant of the support member is chosen to be below 2 $Nm^{-1}$ and preferably below 1 $Nm^{-1}$, more preferably below 0.1 $Nm^{-1}$. It will, of course, be understood that alternative probes, for example those with much higher spring constants, may alternatively be employed depending upon the nature of the interaction to be studied, the characteristics of the sample and/or the performance requirements for the microscopy apparatus.

Additionally, as described in International patent application No. WO2005/008679, the contents of which is incorporated herein by reference, to aid the probe tip imaging the surface of the sample, the mechanical properties of the probe may be altered, for example by coating at least part of the probe in a mechanical energy absorbing polymer and applying an external force directly to the probe tip.

In this example, during a scan the z position or probe height might not be altered by either the coarse translation drive 16 or any other movement control, even where probe deflections in excess of 100 nm are measured, although it is preferable to minimise the change in average interaction between the probe and sample. In order to maintain an average interaction between the probe and the specimen surface which would involve substantially constant probe deflection, optionally, the position of the probe support member may be adjusted during a scan.

Figure 2:
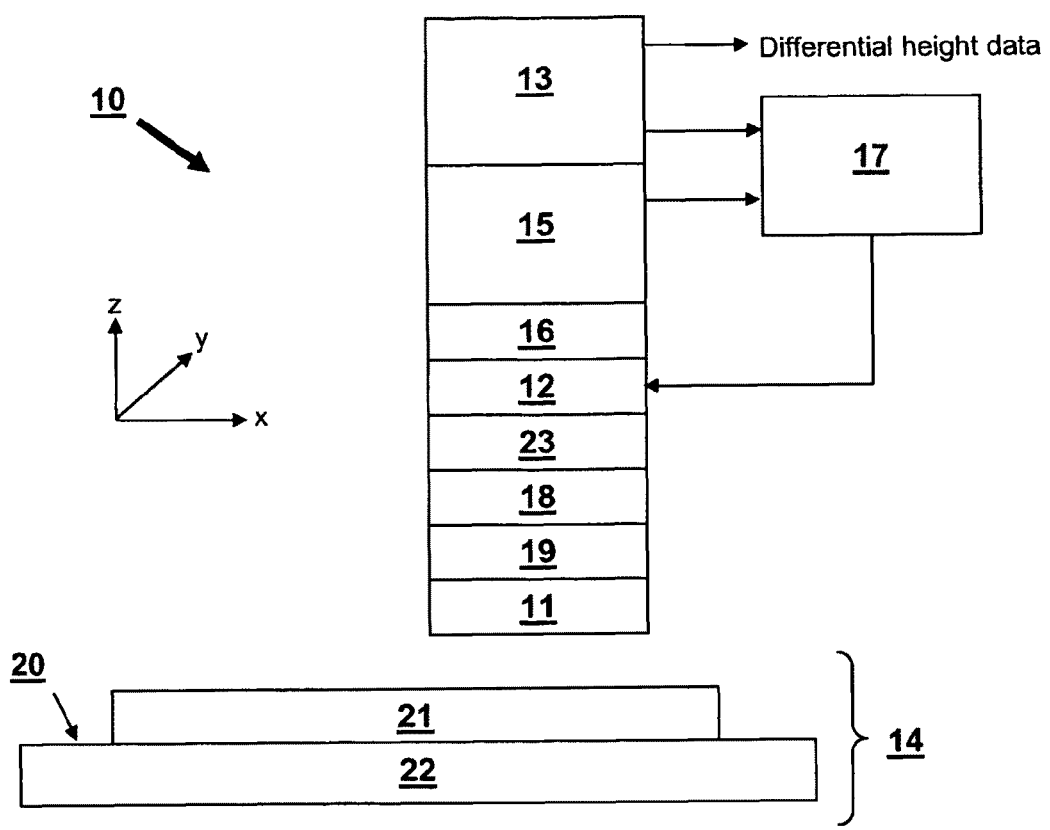
FIG. 2 is a schematic overview of a wafer review tool employing a scanning local probe technique and noise compensation in accordance with the present invention.

With reference to FIG. 2, scanning probe microscopy apparatus in the form of a surface review tool 10, specifically for use as a semiconductor wafer review tool is shown schematically. The review tool 10 generally comprises: a cantilever probe on a probe mount 11; one or more translation stages 12 for controlling movement of the at least one probe in x, y and z orthogonal directions; and a height detection system 13 for monitoring the fluctuating height of the probe. A wafer support 14 is also illustrated but the relative separation of the review tool 10 and the wafer support 14 is not to scale, for ease of reference. The probe comprises a cantilever support member and a nanometric probe tip which preferably has a tip radius of 100 nm or less and with different sizes and shapes of probe tip being employed for different types of scanning or image collection.

The differential interferometer of the height detection system 13 is adapted to have a dynamic range of greater than the expected range of height variations of the probe during a scan of the sample. In practice, the height variations are often well in excess of ½ wavelength of the probe and reference beams, especially in the case of wafer review. Thus, the interferometer described herein is adapted to have a dynamic range of greater than ½ wavelength.

The review tool 10 additionally includes an optical imaging system 15 for enabling a wafer to be imaged at visible/UV wavelengths; a probe height control in the form of a z direction translation drive 16, such as a stepper motor, for the coarse control of the probe in the z direction, in other words control of the separation or height of the probe above the surface of the wafer; optionally a focussing control 23 for controlling the focussing of the height detection system 13 and/or the optical imaging system 15; a probe scanner 18 which controls the scanning movement of the probe relative to the wafer; and a probe controller 17 which automatically controls, by means of the translation stages 12, the alignment of the microscope probe with the height detection system 13 and the wafer by means of data input from the height detection system 13, the optical imaging system 15 and optionally probe position feedback data.

The wafer support 14 preferably includes a movable stage 22 which controls movement of the wafer, in x and y orthogonal directions with an upper surface 20 on which the wafer 21 is mounted.

The basic principle of operation of the review tool 10 is as follows: a wafer is positioned beneath the review tool by means of the movable stage 22. The height detection system 13 is aligned with the back of the probe cantilever and the probe is then lowered towards the wafer using the z direction coarse translation drive 16 and fine adjustment of the probe position using the translation stage 12. The probe is brought close enough to the surface of the wafer for the support member or cantilever of the probe to deflect as a result of an interaction with the surface of the wafer.

Once the desired level of interaction force, and hence deflection of the probe cantilever, is established the probe is scanned over the surface of the wafer by means of the probe scanner 18 whilst the height of the probe is monitored by the system 13. In a scan the probe is moved relative to the surface of the wafer in a line, for example in either of the x or y directions, and measurements are taken by the height detection system 13, along the scan line either continuously or at intervals, of the probe cantilever height. The probe may also be translated in a direction orthogonal to the scan line i.e. the y or x directions, so that an area of the surface of the specimen is scanned. Thus, surface area scanning is performed involving continuously varying x and y probe positions. Although reference has been made to separately scanning in two orthogonal directions, more complex scanning movements of the probe involving simultaneous x and y translations are also envisaged. The measurements in terms of variations in the monitored height of the probe cantilever are representative of one or more characteristics, such as the topography, of the wafer surface and so can be used to produce a 3D map of the scanned surface of the wafer. The probe scanner 18 may also include a resonator 19 so that the probe can be scanned across the surface of the wafer by means of oscillation of the probe at or near its resonant frequency in the scanning plane. By oscillating the probe at or near its resonant frequency the oscillation amplitude accurately and repeatably determines the length of the scan line. In combination with monitoring the fluctuations in height of the probe during the scan, the height detection system 13 monitors vibration of the sample in the z direction and extracts differential probe height data. The differential height data output by the review tool 10 is representative of the absolute or true height of the probe relative to the sample and inherently includes compensation for noise in the form of vertical vibrations arising from external environmental factors, for example from the wafer fabrication production line. The wafer review tool 10 may additionally include conventional means (not shown) for ensuring alignment of the height detection system 13 with the probe and also signal synchronisation means for ensuring synchronisation of the differential height data generated by the height detection system 13 with position data identifying the lateral (x,y) positions of the probe during collection of the differential height data.

Although reference is made herein to an optical imaging system 15 in addition to the height detection system 13, it is envisaged that with the review tool, optionally, only a part of the optical imaging system 15 may be used enabling the review tool 10 to be integrated with or retro-fitted to existing optical microscopy apparatus in the wafer production line. Integration of the optical imaging system and the height detection system offers the advantage that optical images of the wafer surface and images produced using the probe can be directly and automatically aligned and compared.

Figure 3:
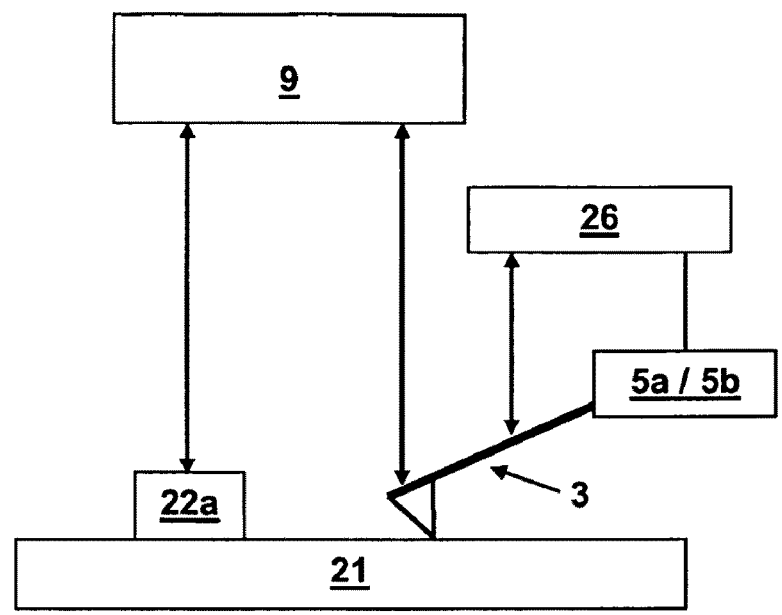
FIG. 3 is a schematic view of a noise compensation design in accordance with the present invention.
Figure 4:
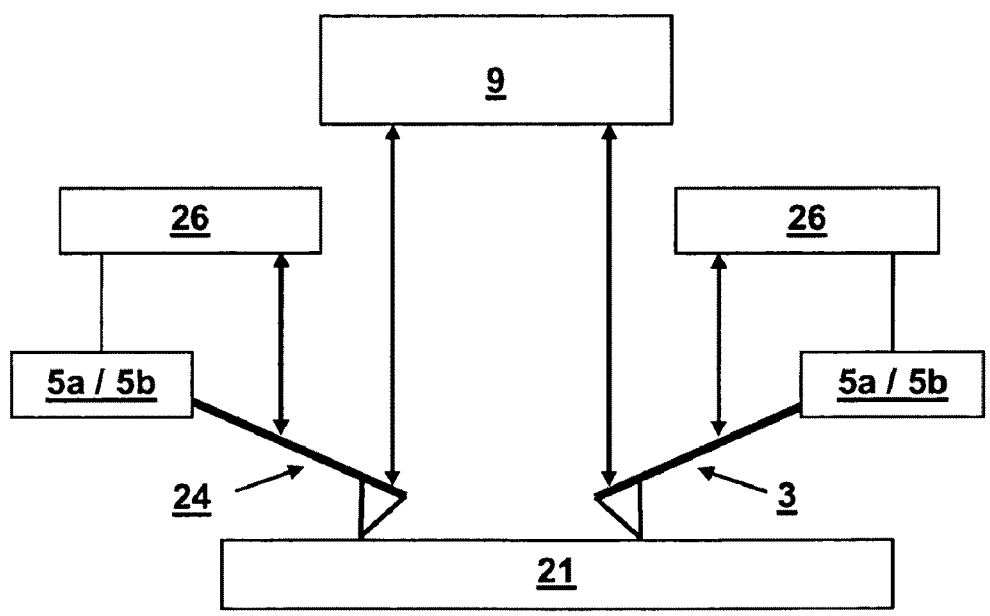
FIG. 4 is a schematic view of an alternative noise compensation design in accordance with the present invention.

In FIGS. 3 and 4 two different designs for noise compensation in the z direction are illustrated employing a feedback control 26 for maintaining constant probe/sample interaction. These designs are suited for use with local probe apparatus utilising low spring constant cantilevers as described earlier amongst other probe microscopy arrangements. In FIG. 3 light, preferably from a common coherent light source (not shown), is split so that a first beam is reflected off the back of the probe cantilever of the local probe apparatus and a second beam is reflected from a fixed x, y position on the specimen support, for example, with a reflector 22a. The use of a separate fixed reflective element is useful where the surface of the specimen is non-reflective or is so irregular as to fail to provide a return beam. The two reflected beams are then combined in an interferometer 9 to provide a differential measurement of the variations in the height of the probe cantilever of the local probe apparatus relative to the reflector 22a. As the fixed x, y position on the reflector 22a is subject to the same vertical vibrations as the x, y positions on the sample surface scanned by the local probe apparatus, these vertical vibrations are cancelled out in the differential interferometric measurements of the probe height with respect to x, y position as the probe is scanned across the sample surface.

In FIG. 4 again differential interferometric measurements of the probe height are recorded. However, with this design the reference height is recorded with respect to a reference probe 24 aligned with a fixed point on the sample. The reference probe 24 is similar to the measurement probe 3 and ideally matches the measurement probe in terms of performance characteristics. To ensure that the reference probe 24 is exposed to substantially the same mechanical vibrations as the measurement probe 3, the reference probe 24 is supported by separate translation stages 25 that are kept inactive during a scan of the surface of the sample so as to fix the position of the reference probe 24.

The noise compensation designs illustrated in FIGS. 3 and 4 are particularly suited for use with the wafer review tool of FIG. 2 as the interferometer of the review tool may be employed to additionally correct for vertical noise at around sub to a few hundred Hertz arising from external environmental vibrations which are prevalent in a wafer fabrication production line. Furthermore, the use of differential interferometric measurements in noise compensation, as illustrated in FIGS. 3 and 4, is also particularly suited to rapid probe engagement with the surface which is a key aspect of any wafer review tool on a wafer fabrication production line. In this configuration the separation between the probe and sample is directly measured which enables the probe to approach the sample at high speed without the risk of contact.

Figure 5:
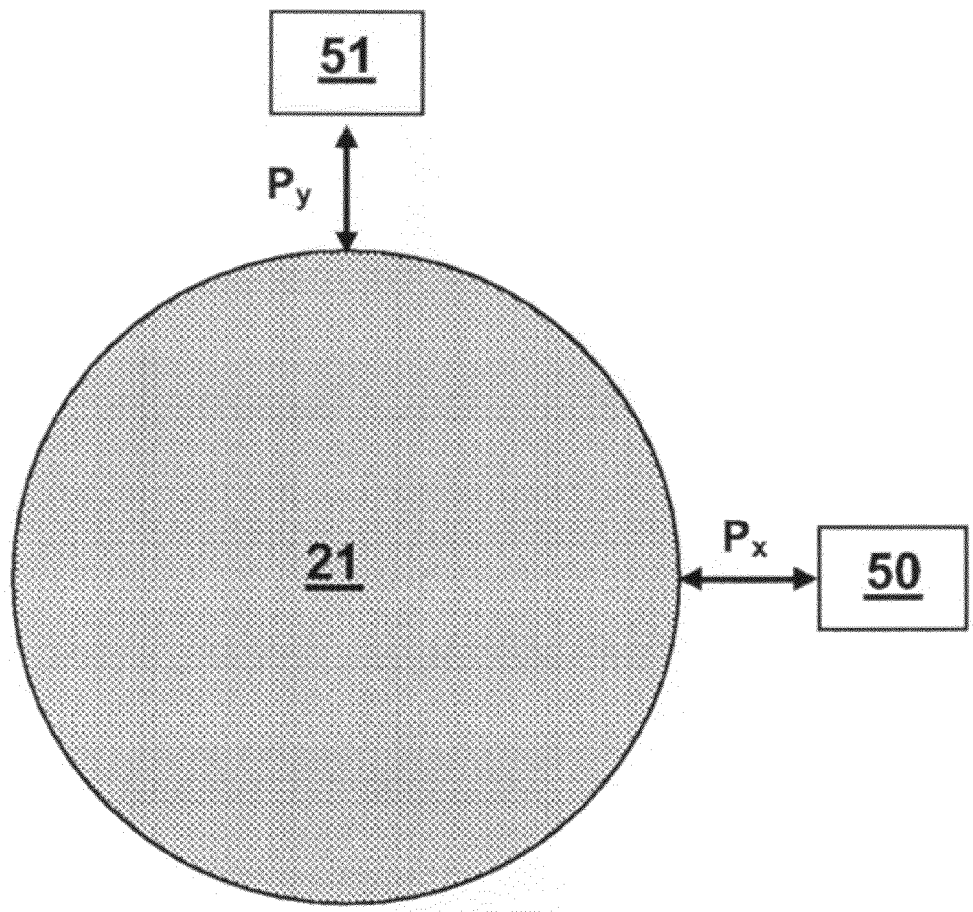
FIG. 5 is a schematic view of a lateral noise compensation system in accordance with the present invention.

The noise compensation designs described above are specific to the correction of noise in the z axis of the local probe apparatus. However, the same or similar techniques may also be employed for correcting for lateral noise i.e. environmental vibrations in the x and y axes. As shown in FIG. 5, to correct for lateral noise, a first position sensitive detector 50, such as an optical displacement sensor, is arranged to monitor for changes in the separation, substantially parallel to the x axis, of the position sensitive detector 50 from a first fixed position which is subject to the same or substantially the same lateral vibrations as the sample e.g. on the side of the sample stage, the sample stage support or a wafer in the case of a wafer review tool. Thus, change in the separation between a pair of predetermined fixed positions is monitored. Similarly, a second position sensitive detector 51 is arranged to monitor for changes in the separation, substantially parallel to the y axis, of the position sensitive detector 51 from a second fixed position which again is subject to substantially the same vibrations as the sample such as on the side of the sample stage, the sample stage support or the wafer. The position of the first and second fixed points are monitored respectively by the first and second position sensitive detectors 50, 51 to provide reference positions $P_x$ and $P_y$ which are synchronised with the probe height measurements generated by the scanning probe microscopy apparatus.

Where any change in $P_x$ and/or $P_y$ is detected, the value of this change is used as a noise compensation in the x,y position of the synchronised measured probe height. The noise compensation may be performed in one of two ways: (i) the change to $P_x$ and/or $P_y$ may be applied as an offset correction to the trajectory of the scan of the probe in which case no post processing of the probe height measurements is required; or (ii) the placement of the probe height position measurement(s) as one or more data points in a pixellated array representative of the surface of the sample or wafer may be offset by the amount of the change in $P_x$ and/or $P_y$. In the latter case, probe height measurements are usually continuously recorded during scanning by the local probe apparatus of the sample surface. As a result, a plurality of probe height measurements are recorded for each pixel of the array (oversampling) and are then integrated within a pixel and across pixels which enables the offsetting of the data point(s) to be accurately represented in the final image of the surface of the sample or wafer generated using the differential probe height measurements. Reference is made herein to the use of optical displacement detection in correcting for noise arising from lateral environmental vibrations, this could be in the form of interferometric or optical encoder measurements of the $P_x$ and $P_y$ positions of the sample stage or the wafer. Any displacement measurement technique with the necessary resolution and bandwidth can be used provided the dynamic displacement range of the measurement is greater than the amplitude of the vibration to be corrected.

In the case of a wafer review tool, the x, y positioning information used to control the initial positioning of the wafer stage beneath the review tool may also be employed for the noise compensation system. Moreover, in a high throughput environment, the use of lateral position sensors 50, 51 enables the sample or wafer to be imaged whilst the sample/wafer stage is still settling because the outputs of the lateral position sensors 50, 51 enables any variation in scan position arising from settling of the sample/wafer stage to be detected and accounted for in the image of the sample/wafer surface.

Instead of a conventional optical displacement sensor a differential interferometer may be used as an alternative method to monitor lateral vibrations. A first beam of the interferometer is reflected from the sample, the sample stage or the sample stage support and a second beam is reflected off a position in a fixed spatial relationship to the probe such as the probe support. The two beams are them interferometrically combined to generate a differential signal representative of vibration in a plane parallel to the imaging plane of the microscope.

Figure 6:
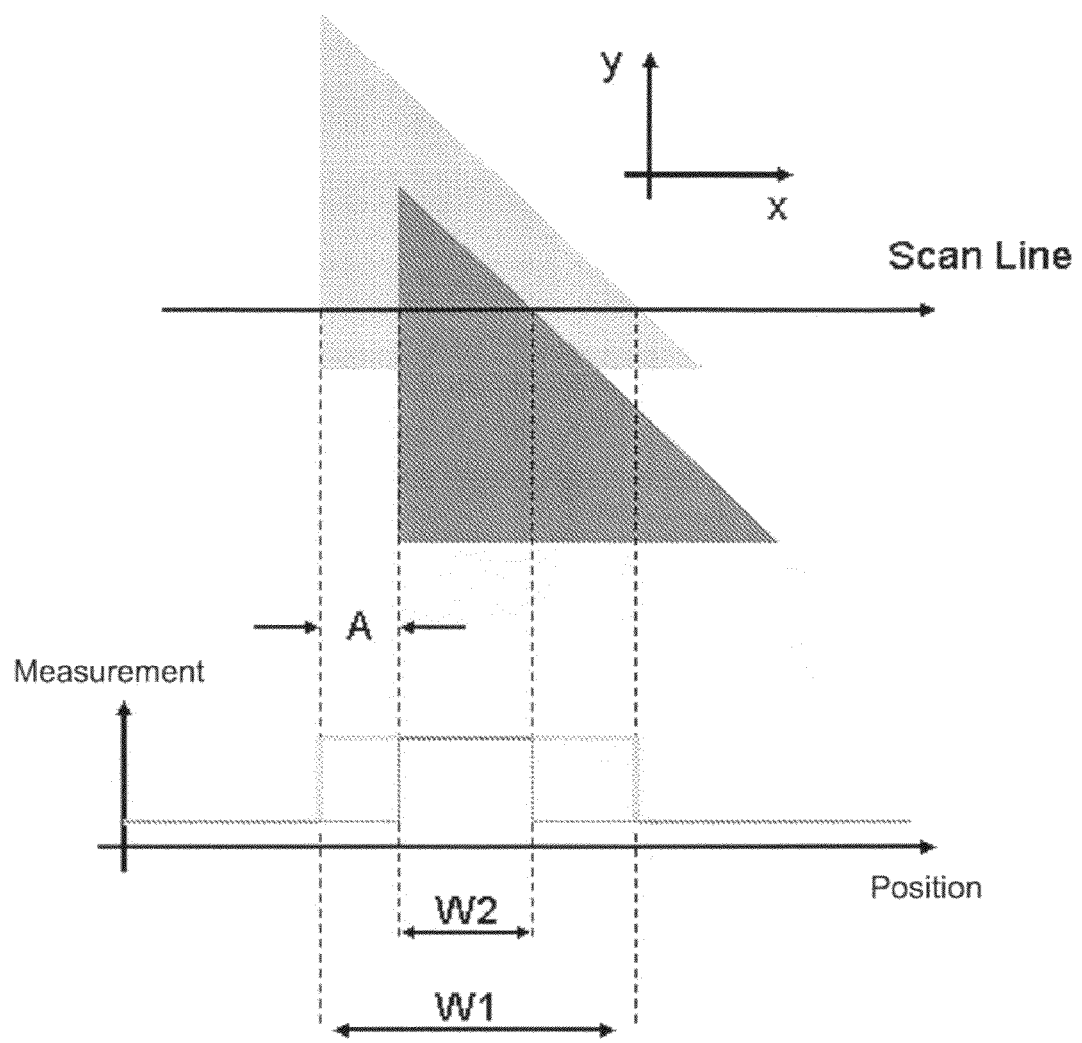
FIG. 6 illustrates how changes in x and y can be identified by collecting a single scan line from a triangle feature.

A further alternative method of measuring changes in the lateral sample position relative to the measurement scanning probe is to use a scanning lateral reference probe imaging a reference structure which is subject to the same or substantially the same lateral vibration as the sample. The scanning lateral reference probe has a fixed lateral position relative to the measurement probe so that any change in the lateral position of the sample will affect both probes equivalently. The scanning lateral reference probe images a predefined structure from which any change in lateral position can be determined i.e. any change in the position of the reference structure parallel to the scanning plane. The maximum vibration frequency component that can be corrected is directly related to the rate at which the lateral position can be monitored and so it is necessary that the scan rate of the scanning lateral reference probe be greater than the measurement probe and preferably greater than the desired pixel collection rate. By appropriate choice of reference structure it is possible to negate the need to scan the reference in both x and y. For example, FIG. 6 demonstrates that both changes in x and y can be obtained by collecting a single scan line from a triangle feature. The displacement in point A and width (W1-W2) provides a measurement of displacement of the sample in the x and y axes respectively.

Thus, it may be seen that with the present invention, greater image resolution of a local probe microscope can be achieved through the cancellation of external environmental vibrations and that this is of particular importance where local probe microscopy apparatus is employed in a wafer review tool of a wafer fabrication production line. Moreover, as the differential interferometric measurements of the wafer review tool provide true-height information, 3D information on wafer feature and defects can be obtained.

Furthermore, with the present invention local probe surveying and imaging techniques can be combined with conventional semiconductor wafer inspection and review techniques and the review tool may be integrated with existing inspection and review apparatus which otherwise may not be possible or at a reduced level of resolution and performance as a result of the noise generated by the existing inspection and review apparatus.

Although reference has been made specifically herein to the present invention being employed in wafer inspection and review, it will be apparent that the present invention is equally applicable to the use of local probe microscopy in a noisy environment and also wherever information on surface topography, such as true-height information, is required as well as other surface characteristics. For example, the present invention may be used as a survey and/or imaging tool in measuring step heights, surface roughness, film thicknesses, critical dimensions and other metrology applications.

Furthermore, the interaction between the probe tip and the surface of the specimen may involve any spatially varying measurable property including one or more of the following: interatomic forces both attractive and repulsive, magnetic, electric, electromagnetic, electron tunnelling, capacitive, thermal interactions, lateral forces or shear forces. The probe sample interaction may also be monitored in quasi-static or dynamic modes of operation, for example, contact, intermittent contact and non-contact.

It should also be borne in mind that although the review tool described above includes a local probe imaging system and an optical imaging system, it is not essential for image data, as such, to be generated by these systems. Instead, for example, the local probe imaging system may only generate probe height information with respect to probe position that is used, for example, in comparative analysis. Also, as mentioned earlier, the probe height information may not be representative of the topography of the specimen surface but may, instead, be representative of one or more other characteristics of the specimen surface. Also, in the case of the optical imaging system, here too it is not essential for the system to generate image data. For example, the optical imaging system may be used for the purposes of alignment of the review tool with the specimen surface.

When measuring different interactions under different measurement conditions, e.g. in a dynamic mode of operation, rather than reflecting the probe beam off the end of the probe cantilever (as illustrated), the probe beam may be reflected off alternative parts of the apparatus. Additionally, although the reference beam is shown being reflected off an upper surface of the sample or sample support, it is envisaged that the reference beam may be reflected off other positions which experience substantially the same vibration e.g. the rear of the sample.

Although the use of piezoelectric actuators for control of the movement of the imaging system and the reference height sensor probe is preferred, other actuators involving for example thermal expansion of a control rod, or a voice coil are envisaged. Similarly, alternative components and arrangements to those described herein may be employed without departing from the scope of the invention as defined in the accompanying claims.

The invention claimed is:

1. A method of compensating for vibration in a local probe measurement apparatus, wherein the method comprises the steps of scanning a scanning probe relative to the surface of the sample; reflecting a probe beam off a reflective point having a fixed spatial relationship with respect to the scanning probe; simultaneously reflecting a reference beam off a fixed reference point subject to vibration substantially the same as the vibration experienced by the sample; and interferometrically combining the reflected probe beam and the reflected reference beam to generate differential probe height data which incorporates compensation for the vibration, the differential probe height data being representative of either changes in the interaction between the scanning probe and the sample surface or the topography of the sample surface.

2. A method as claimed in claim 1, wherein the reference beam is reflected from a predetermined fixed point on one of: the sample, the sample stage and the sample stage support.

3. A method as claimed in claim 1, wherein the measurement apparatus includes a reference probe and the reference beam is reflected from a predetermined fixed point having a fixed spatial relationship relative to the reference probe.

4. A method as claimed in claim 1, wherein the method further comprises monitoring the interaction between the scanning probe and the sample surface and adjusting the position of the scanning probe to maintain a substantially constant interaction.

5. A method as claimed in claim 4, wherein the deflection of the scanning probe is monitored and the position of the scanning probe is adjusted to maintain a substantially constant deflection.

6. A method as claimed in claim 1, further comprising monitoring the separation of a first fixed predetermined position from a second predetermined position on one of the sample, sample stage and sample stage support wherein the separation is substantially parallel to one or other of the scan axes.

7. A method as claimed in claim 6, wherein a fixed sensor is provided to monitor the separation.

8. A method as claimed in claim 7, wherein the fixed sensor is an optical displacement detector.

9. A method as claimed in claim 6, wherein separations between at least two pairs of predetermined fixed positions are monitored, the separation between the first pair of fixed positions being substantially orthogonal to the separation between the second pair of fixed positions.

10. A method as claimed in claim 7, wherein the fixed sensor comprises an interferometric device employing a reference beam reflected off a reference point having a fixed spatial relationship with respect to the probe of the microscopy apparatus, the detected changes in the separation comprising differential lateral separation data.

11. A method as claimed in claim 1, further comprising the step of using a separate scanning reference probe to scan a predefined reference structure which is subject to vibration substantially the same as the vibration experienced by the sample, the shape of the reference structure being defined to enable detection by the scanning reference probe of changes in the position of the reference structure parallel to the scanning plane.

12. A method as claimed in claim 6, wherein the trajectory of the scanning probe is adjusted in response to detected changes in the one or more monitored separations or the position of the reference structure.

13. A method as claimed in claim 6, wherein the differential probe height data is recorded as data points in a pixellated array and the data points within the pixellated array are adjusted in dependence upon detected changes in the one or more monitored separations or the position of the reference structure.

14. A method of correcting for vibration in a local probe measurement apparatus, wherein the method comprises detecting changes in the separation of a first fixed predetermined position from a second predetermined position on one of the sample, sample stage and sample stage support representative of vibration wherein the separation is substantially parallel to one or other of the scan axes.

15. A method as claimed in claim 14, further comprising, simultaneously with the step of detecting changes in the separation, scanning a scanning probe relative to the surface of the sample in an imaging plane of the sample and monitoring changes in height of the scanning probe either representative of changes in the interaction between the scanning probe and the sample surface or representative of the topography of the sample surface.

16. A method as claimed in claim 14, wherein a fixed sensor is provided to monitor the separation.

17. A method as claimed in claim 16, wherein the fixed sensor is an optical displacement detector.

18. A method as claimed in claim 14, wherein separations between at least two pairs of predetermined fixed positions are monitored, the separation between the first pair of fixed positions being substantially orthogonal to the separation between the second pair of fixed positions.

19. A method as claimed in claim 16, wherein the fixed sensor comprises an interferometric device employing a reference beam reflected off a reference point having a fixed spatial relationship with respect to the probe of the microscopy apparatus, the detected changes in the separation comprising differential lateral separation data.

20. A method as claimed in claim 15, wherein the trajectory of the scanning probe is adjusted in response to detected changes in the one or more monitored separations.

21. A method as claimed in claim 15, wherein changes in the height of the scanning probe are recorded as data points in a pixellated array and the data points within the pixellated array are adjusted in dependence upon detected changes in the one or more monitored separations.

22. A local probe microscopy apparatus comprising a scanning probe; scanning means for scanning the probe relative to the surface of a sample which is subject to externally applied vibration; an imaging device for reflecting a probe beam off a reflective point having a fixed spatial relationship with respect to the scanning probe and for simultaneously reflecting a reference beam off a fixed reference point subject to vibration substantially the same as the vibration experienced by the sample; and an interferometric device for interferometrically combining the reflected probe beam and the reflected reference beam to generate differential probe height data which incorporates compensation for vibration experienced by the sample, the differential probe height data being representative of either changes in the interaction between the scanning probe and the sample surface or the topography of the sample surface.

23. The local probe microscopy apparatus as claimed in claim 22, further comprising a probe interaction detector for monitoring the interaction between the scanning probe and the sample surface and for adjusting the position of the scanning probe to maintain a substantially constant interaction.

24. The local probe microscopy apparatus as claimed in claim 23, wherein the probe interaction detector is a probe deflection detector for monitoring the deflection of the scanning probe and a feedback mechanism in communication with the probe deflection detector for maintaining a substantially constant deflection of the scanning probe.

25. The local probe microscopy apparatus as claimed in claim 22, further comprising a fixed reference probe wherein the reference beam is reflected off a predetermined reference point having a fixed spatial relationship with respect to the reference probe.

26. The local probe microscopy apparatus as claimed in claim 22, further comprising a position monitoring device adapted to detect changes in the separation of a first fixed predetermined position from a second predetermined position on one of the sample, sample stage and sample stage support representative of vibration wherein the separation is substantially parallel to one or other of the scan axes.

27. The local probe microscopy apparatus as claimed in claim 26, wherein the position monitoring device includes a fixed sensor located to monitor changes in the separation between the first and second predetermined fixed positions.

28. The local probe microscopy apparatus as claimed in claim 27, wherein the fixed sensor is an optical displacement sensor arranged such that at least part of a reference beam extending between the optical displacement sensor and one of the predetermined fixed positions is substantially parallel to one of the scan axes of the probe.

29. The local probe microscopy apparatus as claimed in claim 26, wherein the position monitoring device is adapted to detect changes in the separations between at least two pairs of predetermined fixed positions, the separation between the first pair of fixed positions being substantially orthogonal to the separation between the second pair of fixed positions.

30. The local probe microscopy apparatus as claimed in claim 27, wherein the fixed sensor comprises an interferometric device employing a reference beam reflected off a reference point having a fixed spatial relationship with respect to the probe of the microscopy apparatus, the detected changes in the separation comprising differential lateral separation data.

31. A local probe microscopy apparatus comprising a position monitoring assembly adapted to detect changes in the separation of a first fixed predetermined position from a second predetermined position on one of the sample, sample stage and sample stage support representative of vibration wherein the separation is substantially parallel to one or other of the scan axes.

32. The local probe microscopy apparatus as claimed in claim 31, wherein the position monitoring assembly includes at least two fixed sensors adapted to detect changes in the respective separations between at least two pairs of predetermined fixed positions, the separation between the first pair of fixed positions being substantially orthogonal to the separation between the second pair of fixed positions.

33. The local probe microscopy apparatus as claimed in claim 31, wherein the at least one fixed sensor is an optical displacement sensor.

34. The local probe microscopy apparatus as claimed in claim 31, wherein the at least one fixed sensor comprises an interferometric device employing a reference beam reflected off a reference point having a fixed spatial relationship with respect to the probe of the microscopy apparatus, the detected changes in the separation comprising differential lateral separation data.

* * * * *